(12) United States Patent
Wishne et al.

(10) Patent No.: US 9,965,801 B1
(45) Date of Patent: May 8, 2018

(54) SYSTEMS AND METHODS FOR VIRTUAL FITTINGS

(71) Applicant: CAPITAL ONE SERVICES, LLC, McLean, VA (US)

(72) Inventors: Justin Wishne, Chicago, IL (US); Justin Smith, Chicago, IL (US); Karen Nickerson, Chicago, IL (US); Hannes Jouhikainen, Arlington, VA (US); Drew Jacobs, Arlington, VA (US); Marco S. Giampaolo, Berwyn, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days. days.

(21) Appl. No.: 15/664,877

(22) Filed: Jul. 31, 2017

Related U.S. Application Data

(60) Provisional application No. 62/437,704, filed on Dec. 22, 2016.

(51) Int. Cl.
| | |
|---|---|
| *G06Q 30/00* | (2012.01) |
| *G06Q 30/06* | (2012.01) |
| *G06T 19/20* | (2011.01) |
| *G06T 19/00* | (2011.01) |

(52) U.S. Cl.
CPC ....... *G06Q 30/0643* (2013.01); *G06T 19/006* (2013.01); *G06T 19/20* (2013.01); *G06T 2200/24* (2013.01); *G06T 2219/2004* (2013.01)

(58) Field of Classification Search
CPC .......................................... G06Q 30/06–30/08

USPC ............................................... 705/26.1–27.2
See application file for complete search history.

(56) References Cited

U.S. PATENT DOCUMENTS

| | | | |
|---|---|---|---|
| 9,579,236 B2* | 2/2017 | Amedi | A61H 3/061 |
| 2016/0189288 A1* | 6/2016 | Todeschini | G06Q 30/0643 |
| | | | 705/27.2 |
| 2016/0210602 A1* | 7/2016 | Siddique | G06Q 20/0453 |

OTHER PUBLICATIONS

"Virtually T-Touchable: Tissot Launches an Augmented Reality Application on Its Website and Brings 3D Augmented Reality Advertising to the Watch Market" (PR Newswire, Jun. 21, 2010) https://dialog.proquest.com/professional/docview/738156621?accountid=142257 (Year: 2010).*

* cited by examiner

*Primary Examiner* — Ethan D Civan
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method. The system may provide a virtual fitting system. The system may store sizing data including a 3-dimensional model of a target. The system may then receive user input data indicating the selection of a test object. In response to this identification, the system may receive a 3-dimensional model of the test object. The system can then apply the test object model to the target model to create a virtual fit model, and provide the virtual fit model to the computing device.

20 Claims, 6 Drawing Sheets

SYSTEMS AND METHODS FOR VIRTUAL FITTINGS

CROSS-REFERENCE TO RELATED APPLICATION

This application claims the benefit of U.S. Provisional Application No. 62/437,704, filed 22 Dec. 2016, the entire contents and substance of which is hereby incorporated by reference.

FIELD OF INVENTION

The present disclosure relates to systems and methods for virtual trial fittings, and more particularly using 3-dimensional models to provide virtual test fitting of an item.

BACKGROUND

Online shopping is becoming an increasingly popular way for consumers to purchase a variety of items without having to travel to a store. For some types of items, online shopping provides a very convenient and simple way to purchase an item. However, for other types of items, consumers may still prefer to physically inspect, measure, or try on the item before purchasing it or risk having to purchase (and return) multiple items. For example, many consumers prefer to buy clothing in a store so that they can try on the items and assess the fit and feel of the item. As another example, consumers may prefer to see items like home goods or furniture in person to take measurements or evaluate how the item may fit in with existing décor.

However, it is not always possible or practical to see items in a store for a number of reasons. The consumer may not have the time or means to travel to a store, and the desired item in the desired size or color may not be in stock at a local store. At present, consumers can purchase items without getting to try them on and/or rely on images from a catalog or product review; however, these options leave much to be desired in the way of fitting.

Accordingly, there is a need for systems and methods for allowing for virtual trial fittings of items, such as consumer products. Such systems can allow customers to virtually try on or test fit items without about the hassle of traveling to a physical store after confirming (or hoping) that the physical store has the right item or size in stock. Embodiments of the present disclosure are directed to this and other considerations.

SUMMARY

Disclosed embodiments provide systems and methods for virtual trial fittings, and more particularly using 3-dimensional ("3-D") models to provide virtual test fitting of an item.

Consistent with the disclosed embodiments, the system may include one or more memory devices storing instructions, and one or more processors configured to execute the instructions to perform steps of a method to provide a virtual fitting system. The system may store sizing data including a 3-D model of a target. The system may then receive user input data indicating the selection of a test object. In response to this identification, the system may receive a 3-D model of the test object. The system can then apply the test object model to the target model to create a virtual fit model, and provide the virtual fit model to a computing device.

Consistent with the disclosed embodiments, methods for providing a virtual fitting system are also provided.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
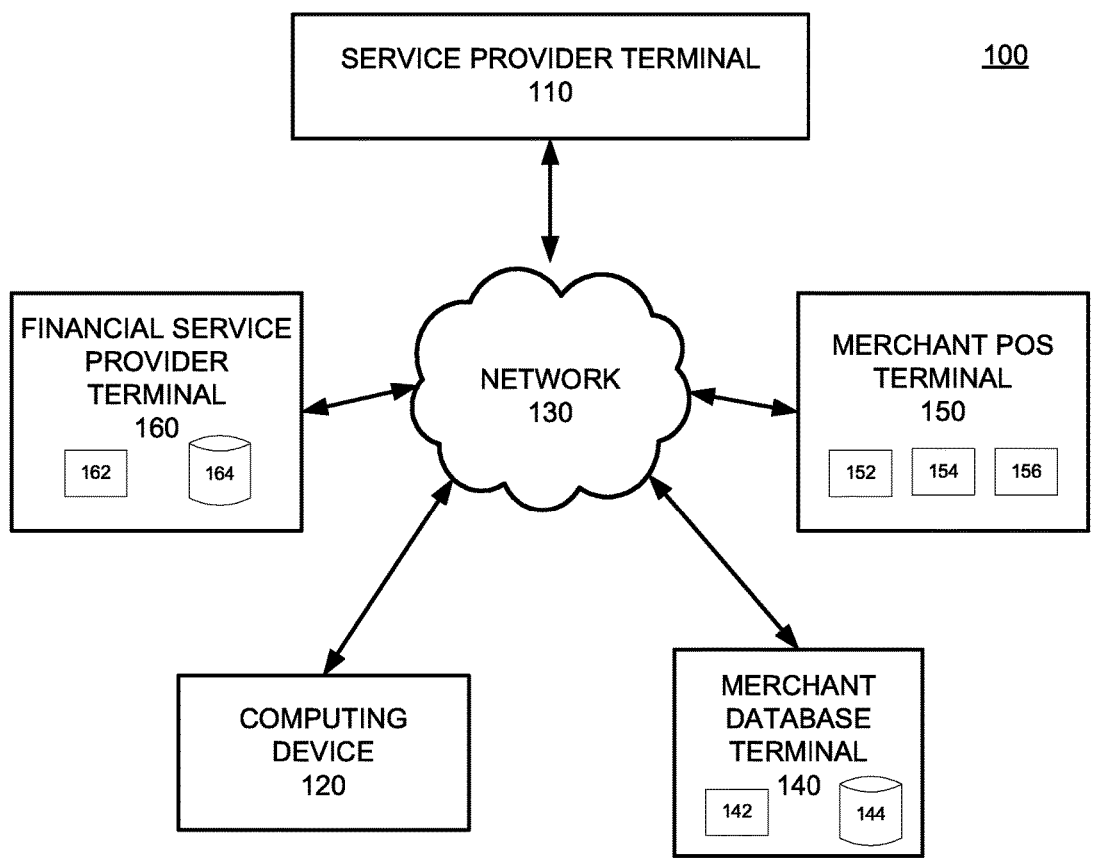
FIG. 1 is a diagram of an exemplary system that may be used to provide a virtual trial fitting.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing a virtual trial fitting. The system may include one or more memory devices storing instructions, and one or more processors configured to execute the instructions to perform steps of a method. Specifically, in some embodiments, the system may provide a virtual trial fitting. To accomplish this, the system may execute the instructions to store sizing data including a 3-dimensional model of a target. The system may then receive user input data indicating the selection of a test object. In response to this identification, the system may receive a 3-dimensional model of the test object. The system can then apply the test object model to the target model to create a virtual fit model, and provide the virtual fit model to the computing device.

In another embodiment, a virtual fitting system may include one or more environmental sensors for obtaining environmental data comprising audio and/or visual information representing a physical environment and target data comprising one or more dimensions of a target. The system may include a user interface for generating user input data in response to receiving user inputs, wherein the user input data is at least indicative of a selected test object. The system may include an input/output device for receiving, from a merchant database, a 3-dimensional test object model associated with the selected test object. The system may further include an augmented environment processor that, based on target data obtained from the one or more environmental sensors, may generate a 3-dimensional target model of the target, apply the 3-dimensional test object model associated with the selected test object to the 3-dimensional target model to create a virtual fit model, and generate a signal comprising augmented environmental data by integrating the virtual fit model with environmental data obtained by the one or more environmental sensors. The system may also include an augmented environmental data display that receives the signal comprising augmented environmental data and displays said augmented environmental data in accordance with said signal.

In another aspect, a non-transitory computer-readable medium storing instructions is disclosed. The instructions, when executed by one or more processors, may cause a computing device to perform steps of a method for providing a virtual trial fitting. Specifically, the computing device may store sizing data including a 3-dimensional model of a target. The computing device may then receive user input data indicating the selection of a test object. The computing device may then receive user input data indicating the selection of a test object. In response to this identification, the computing device may receive a 3-dimensional model of the test object. The instructions may then direct the computing device to apply the test object model to the target model to create a virtual fit model, and provide the virtual fit model to the computing device.

In another aspect, a method of providing a virtual trial fitting is disclosed. The disclosed method can include storing sizing data including a 3-dimensional model of a target, and receiving user input data indicating the selection of a test object. Next, the method can include receiving a 3-dimensional model of the test object, and applying the test object model to the target model to create a virtual fit model. The method can then include providing the virtual fit model to the computing device for display to a user.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can generate or receive 3-dimensional models and provide a virtual fit model. The components and arrangements shown in FIG. 1 are not intended to limit the disclosed embodiments as the components used to implement the disclosed processes and features may vary.

In accordance with disclosed embodiments, virtual fitting system 100 may include a service provider terminal 110 in communication with a computing device 120 via network 130. In some embodiments, service provider terminal 110 is also in communication with a merchant database terminal 140 via network 130. Computing device 120 may include a mobile computing device (e.g., a smart phone, tablet computer, smart wearable device, portable laptop computer, voice command device, or other mobile computing device) or a stationary computing device (e.g., a stationary desktop or other stationary computer). Computing device 120 may belong to or be provided by a consumer, or may be borrowed, rented, or shared. In some embodiments, computing device 120 may be configured to provide one or more of an augmented reality and a virtual reality experience to one or more users, and may be equipped with a display, speakers or other auditory devices, tactile simulators, and other devices configured to engage the user's senses to enhance the augmented/virtual reality experience.

In some embodiments, virtual fitting system 100 may connect to a merchant database terminal 140 that communicates with other devices of system 100 via network 130. Optionally, in some embodiments, virtual fitting system 100 may also include a merchant point of sale (POS) terminal 150 that communicates with other devices of system 100 via network 130. Additionally, in some embodiments, virtual fitting system 100 may also include a financial service provider terminal 160 that communicates with other devices of system 100 via network 130.

Network 130 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
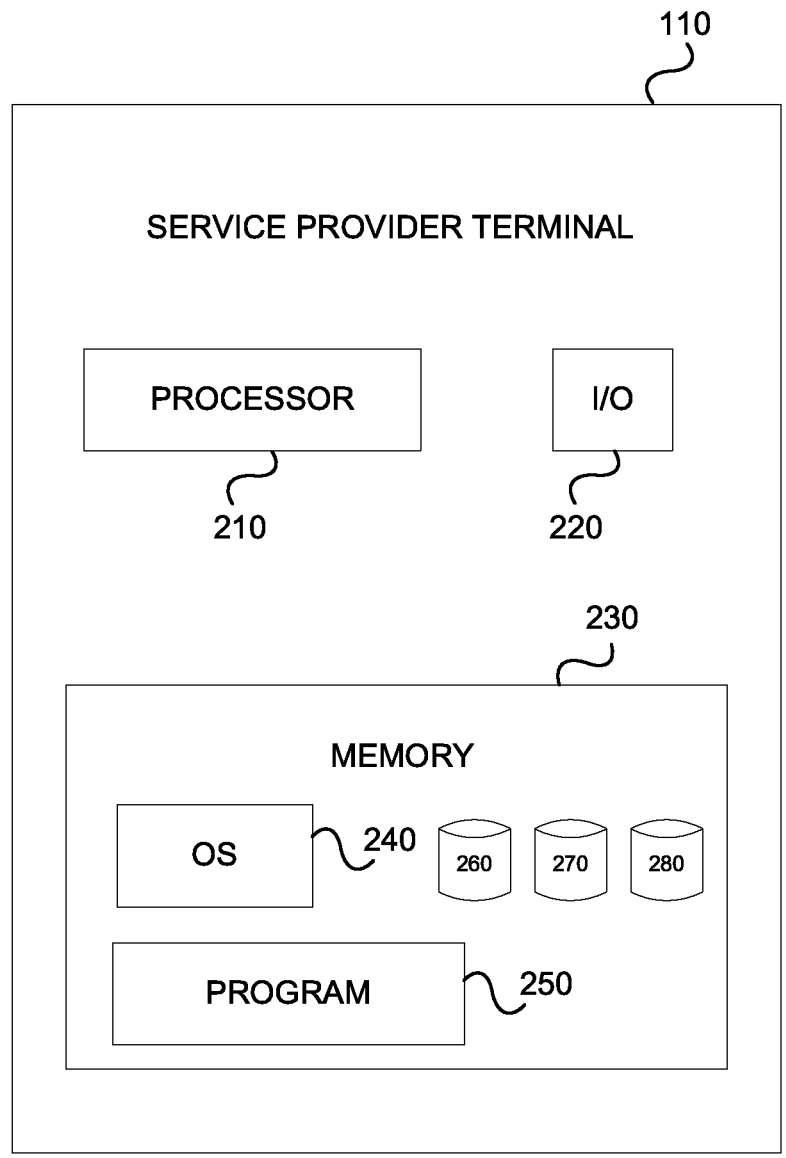
FIG. 2 is a component diagram of an exemplary service provider terminal.

An exemplary embodiment of service provider terminal 110 is shown in more detail in FIG. 2. Computing device 120, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, Z-Wave™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a sizing data database 260, a 3D model database 270, and an environmental database 280 for storing related data to enable service provider terminal 110 to perform one or more of the processes and functionalities associated with the disclosed embodiments. Sizing data database 260 may include stored data relating to information related to the size, shape, or other information pertaining to a target. In some embodiments, targets may include portions or the entirety of a human figure, a particular space in a room, or some other object or space where trying on or test fitting an item would be desirable. 3D model database 270 may include stored data relating to 3D models of targets and/or test objects, such as articles of clothing, pieces of furniture, or items of home decor. Environmental database 280 may include stored data relating to a physical environment that is captured by one or more devices (e.g., computing device 120) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL databases, SharePoint™ databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 140 may have one or more processors 142 and one or more merchant databases 144, which may be any suitable repository of merchant data. Merchant database terminal 140 may be located at the POS location, off-site at another merchant location, or at a third party location. Information stored in merchant database terminal 140 may be accessed (e.g., retrieved, updated, and added to) via network 130 by one or more devices (e.g., service provider terminal 110) of system 100. In other embodiments, merchant POS terminal 150 may be configured to process online transactions on behalf of the associated merchant.

Merchant POS terminal 150 may have one or more POS devices 152, 154, 156 that communicate with one or more devices (e.g., computing device 120) of system 100 via network 130. In some embodiments, POS devices 152, 154, 156 may be associated with one or more products or items at a POS location, and may serve as beacons to identify the associated products or items and related information to one or more devices of system 100.

Figure 6:
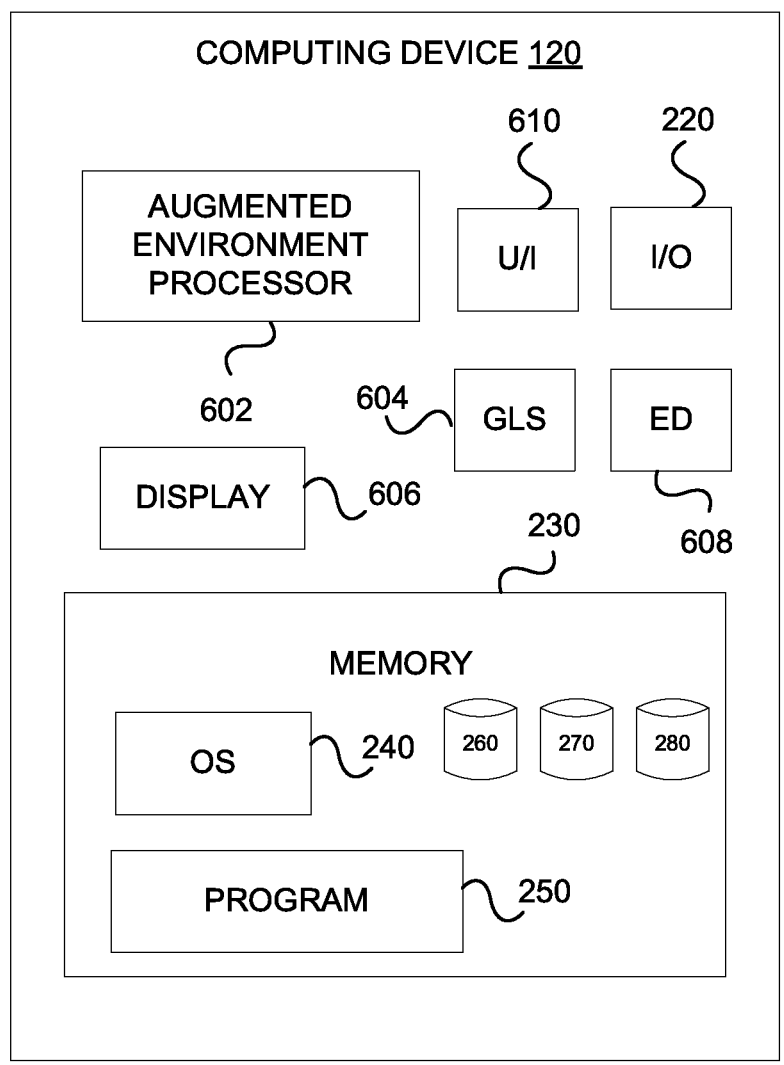
FIG. 6 is a component diagram of an exemplary computing device.

FIG. 6 shows an exemplary embodiment of computing device 120. As shown, computing device 120 may include input/output ("I/O") device 220 for receiving a 3-dimensional test object model associated with the selected test object from a merchant database 144, memory 230 for storing profile data and containing operating system ("OS") 240 and program 250 and all associated components as described above with respect to service provider terminal 110. Computing device 120 may also have one or more processors, including an augmented environment processor 602 for generating signals representative of augmented and/or virtual environments, a geographic location sensor ("GLS") 604 for determining the geographic location of computing device 120 and/or an associated environmental data sensor 608, an augmented environmental data display 606 for displaying augmented environmental data, and an environmental data ("ED") sensor 608 (which may also be referred to as an "environmental sensor") for obtaining environmental data including audio and/or visual information representing a physical environment and target data comprising one or more dimensions of a target, and a user interface ("U/I") 610 for generating user input data in response to receiving user inputs. In some embodiments, user interface 610 may include any of the components described with respect to I/O device 220 above. In some embodiments, environmental data sensor 608 may include a microphone or a digital camera. In some embodiments, environmental data sensor 608 may include a physical sensor or an optimal sensor that may scan the target. According to some embodiments, augmented environment processor 602 may include all of the features and functions of processor 210 described above. Further, augmented environment processor 602 may be configured to, based on target data obtained from the one or more environmental sensors 608, generate a 3-dimensional target model of the target, apply the 3-dimensional test object model associated with the selected test object to the 3-dimensional target model to create a virtual fit model, and generate a signal comprising augmented environmental data by integrating the virtual fit model with environmental data obtained by the one or more environmental sensors 608. The augmented environmental data signal may be sent to augmented environmental data display 606 to display the virtual fit model in accordance with the signal. In some embodiments, an augmented environment data signal may be used to create an augmented reality display of the virtual fit model in the physical environment, for example, the virtual fit model may be displayed for viewing using a smart mirror.

Figure 3:
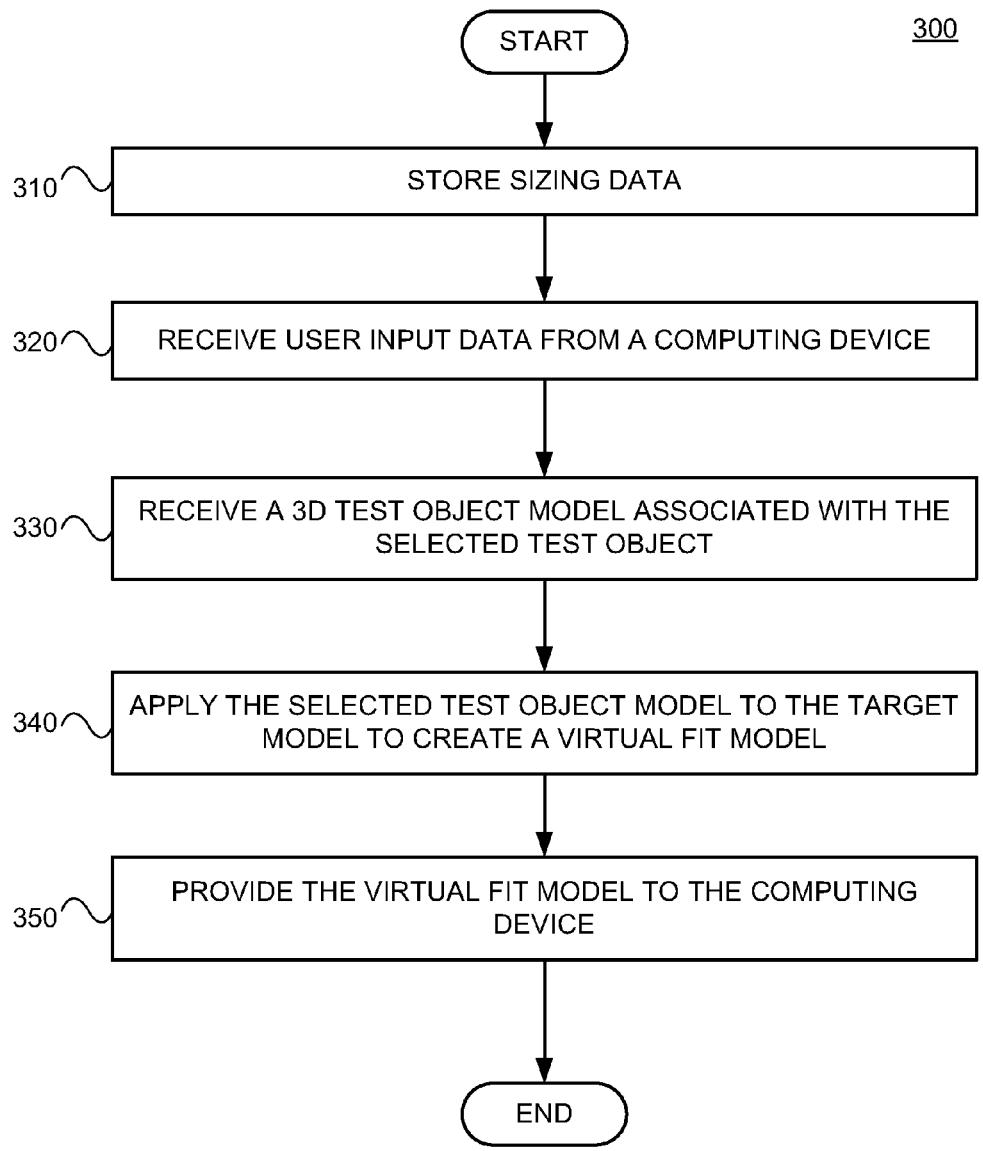
FIG. 3 is a flowchart of an exemplary method for providing a virtual trial fitting.

FIG. 3 shows a flowchart of method 300 for providing a virtual fitting. Method 300 may be performed by service provider terminal 110 using processor 210 to execute memory 230. In some embodiments, one or more steps of method 300 may be delegated to other devices or systems in system 100, such as computing device 120, merchant database terminal 140, merchant POS terminal 150 and/or financial service provider terminal 160. Following method 300, user(s) may virtually test fit one or more items.

In block 310, service provider terminal 110 may store sizing data (e.g., in sizing database 260). Sizing data may include information such as dimensions or other information indicative of or comprising a 3D model of a test object. Sizing data may be entered directly by a user (e.g., via computing device 120 or merchant POS terminal 150), stored on and retrieved from merchant database terminal 140, provided by sensors such as a 3D scanner or a 2D camera, or stored on and read from an object itself, such as through scanning a barcode, RFID tag, or similar. A user may directly enter measurements or other information sufficient to aid in the creation of a 3D model (e.g., via computing device 120 or merchant POS terminal 150). This model can be stored on a local device or a terminal, such as, for example, computing device 120 or merchant POS terminal 150. In some embodiments, a 3D scanner may provide 3D model data with respect to a person's body or an environment such as a room in a user's home. A 2D camera may provide a plurality of 2D images that service provider terminal 110 may use to generate a 3D model.

At step 320, service provider terminal 110 may receive user input data comprising the selection of a test object such as an item of clothing or furniture. User input data may be actively provided by a user (e.g., via manual input into computing device 120 or merchant POS terminal 150), or via passive methods such as visually recognizing shapes, bar codes, QR codes, or IR beacons or Bluetooth™ beacons located in an environment (e.g., POS devices 152, 154, and 156 associated with one or more products or items at a POS location or devices associated with different predefined areas of a closet, refrigerator, pantry, etc. that stores items that are periodically repurchased), or the like. Having received the test object selection, at step 330 service, provider terminal 110 may request and receive a 3D test object model associated with the test object. Test object models can be retrieved from merchant database terminal 140, financial service provider terminal 160, or any other suitable database.

At step 340, service provider terminal 110 may apply the test object model to the target model to create a virtual fit model. In some embodiments, this application may involve matching data points located in the target model with points on the test object model, to align the two models and to provide a virtual fit. In some embodiments, comparing the two models may provide information about the potential fit. For example, a comparison between a particular dimension in the target model and the corresponding dimension in the test object model may demonstrate that the test item will be a tight fit.

In block 350, service provider terminal 110 may provide the virtual fit model to computing device 120 or another display device in order to display the fit to the user. In some embodiments, the virtual fit model may be a 3D rendering of the test object on the target. Virtual fit models may further include: mirror reflections of a user with items digitally overlaid (via headset/device projection or rendered on a display; 3D-modeled likenesses with similar dimensions to those captured by the user; or a non-full body rendering of an applicable area, with color-coded indicators reflecting how tight/loose or long/short the item would be on the user. The virtual fit model may be displayed on a device such as a computing device (e.g., computing device 120), a monitor, a smart mirror, or an augmented or virtual reality display.

Figure 5:
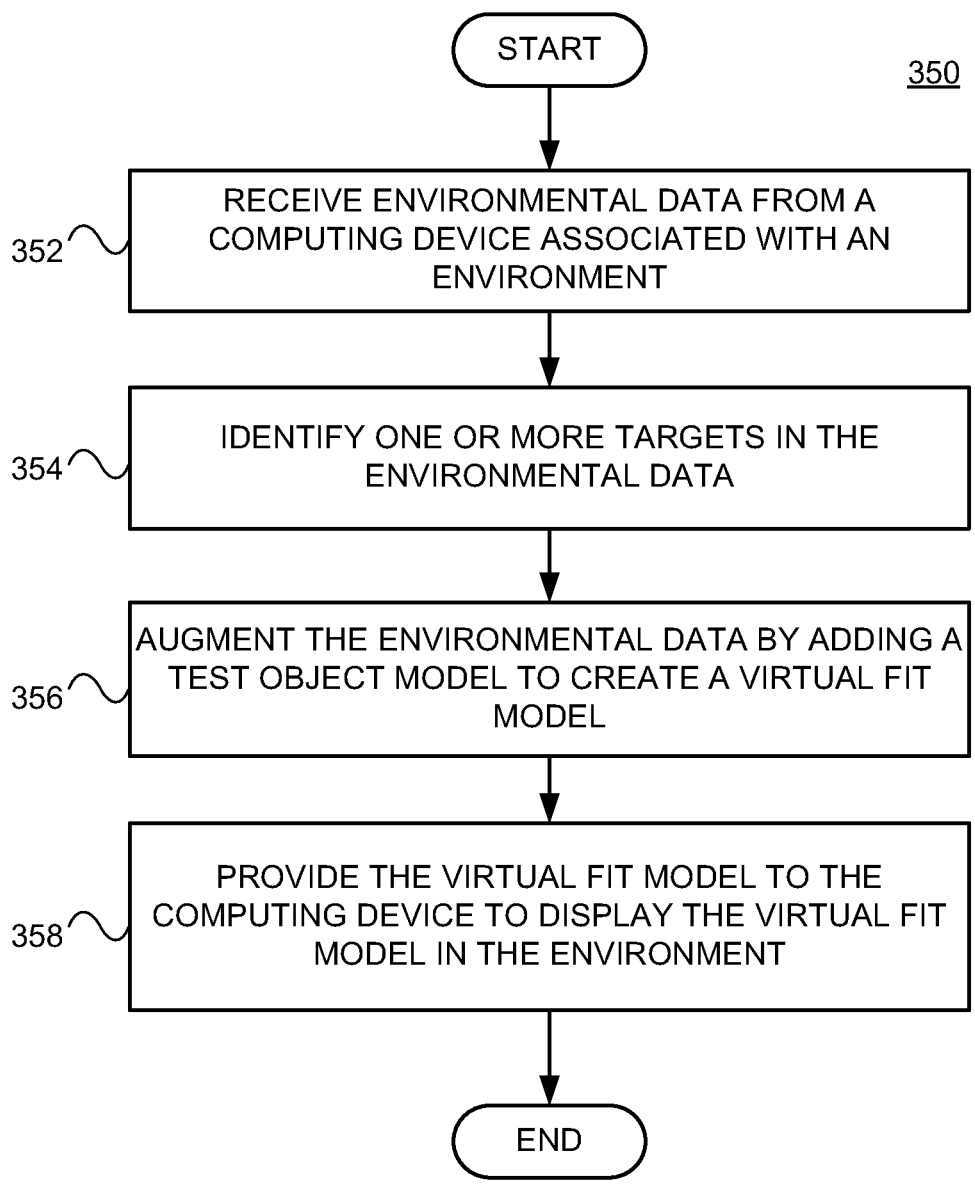
FIG. 5 is a flowchart of an exemplary method for providing a virtual trial fitting.

In some embodiments, as shown in more detail in FIG. 5, block 350 may include one or more additional sub-steps. For example, at step 352, service provider terminal 110 may receive environmental data comprising audio and visual data associated with and representative of an environment. The data may be provided by a camera or similar capture device that may be part of or in communication with computing device 120. At step 354, service provider terminal 110 may identify one or more targets in the environmental data; and at step 356, the terminal may augment the environmental data by adding the test object model over a recognized target in order to generate the virtual fit model in the environment. Once the virtual fit model has been added to the environmental data, at step 358, the system 100 may provide the virtual fit model and environmental data to the computing device 120 or another display device as discussed with respect to block 350 above.

After displaying the virtual fit model to a user (e.g., via computing device 120), system 100 may receive user input (e.g., via computing device 120 or merchant POS terminal 150) in response to the virtual fit model, and this user input can be communicated to other devices in system 100 (e.g., service provider terminal 110). For example, the user of computing device 120 may touch a screen, make a gesture in the visual field of a video capturing component of computing device 120, speak a command into an audio capturing component of computing device 120, enter an input using a connected input device, or some combination of these. In some embodiments, computing device 120 may be an augmented or virtual reality device including a headset and a camera. In such embodiments, the user may be viewing the virtual fit model, and may physically reach for an element in that environment to generate user input data. For example, the user input data may reflect the user's desire to select another test object, or to purchase the currently selected item.

Figure 4:
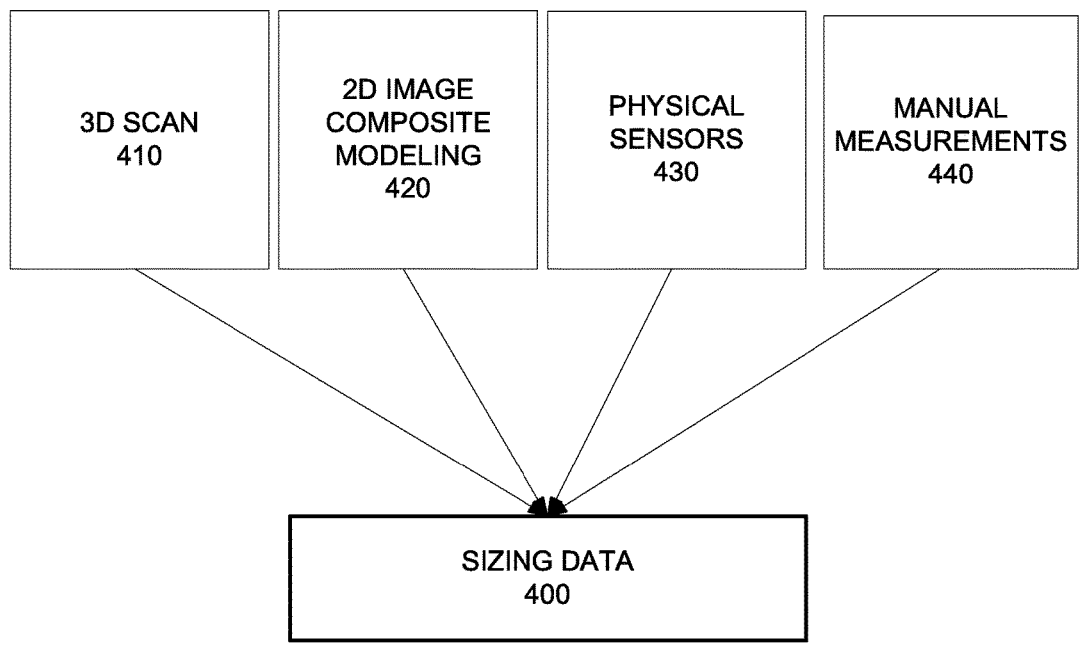
FIG. 4 is a diagram of exemplary types of sizing data.

FIG. 4 shows a diagram that represents an embodiment of exemplary types of sizing data 400. For example, sizing data 400 may comprise 3D scan 410, 2D composite modeling 420, physical sensors 430, manual measurements 440, or another suitable source of information. 3D scan 410 can be generated by one or more devices of system 100 (e.g., computing device 120 or merchant POS terminal 150) or from other sensors such as optical sensors. 2D composite modeling 420 may be generated by computing device 120, service provider terminal 110, or merchant database terminal 140 based on a plurality of 2D images combined to form a 3D model. Physical sensors 430 can include measurement devices designed to physically measure particular dimensions of a target. Examples of physical sensors 430 may include sensors such as circumferential sensors, length sensors, or other similar sensors alone or in combination with other sensors. For example, one or more circumferential sensors may be placed in a garment such as a pair of pants or a glove to measure the circumferences of various portions of a user's body or hand. In some embodiments, measurements are taken manually and provided to the system 100. Such measurements can be measured with a tape measure, caliper, or ruler. These measurements may then be entered into a user interface on computing device 120. Service provider terminal 110, computing device 120, merchant database 140, or merchant POS terminal 150 may then use the provided measurements to model the target.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. The user may have sizing data stored in the system (e.g., system 100), and may be in their home looking at clothing options for purchase on a personal computer or mobile computing device (e.g., computing device 120). The user (e.g., via computing device 120) may select an item (e.g., a pair of pants) to be virtually tried on, and the system may retrieve a 3D model of the pants from a merchant database (e.g., via merchant database terminal 140), and overlay the target model (e.g., of the user or of an average person having one or more size measurements corresponding with the stored sizing data for the user) with the model of the pants to be tried on. The system can then provide a 3D rendering of the item on the target model for display (e.g., via computing device 120 or merchant POS terminal 150), illustrating to the user how the chosen pants would fit. Sensors and haptics may also be incorporated to provide a way for user to sense how a material feels (e.g. silk vs denim), or to provide a way for the user to understand how tightly or loosely an item might fit.

Embodiments of this disclosure may be used in retail clothing applications to provide users with the ability to virtually try on many different combinations of clothing items, whether or not those items are in stock at a retail location or present in a user's home. Providing devices such as a smart mirror that would capture environmental data, generate a model of the user's body, and then display that information to the user in the form of a virtual outfit reflected in the mirror. Should the user desire to change colors, sizes, or styles of the clothing being virtually fit, voice commands, gesture-based commands, or the like can change the test item accordingly.

Another exemplary use case relates to a furniture fitting system, whereby a user can use a mobile device (e.g., computing device 120) to view their home with augmented reality 3D versions of furniture or other home goods they wish to purchase. The user may select (e.g., via computing device 120) a piece of furniture such as a couch, and the system (e.g., system 100) can then model the room as the target, and then display a virtual fit model that is a true to size representation of how the couch would fit into a given space. Such a system can also help a user visualize not only how an item will fit size-wise, but also can provide a representation of how the colors, patterns, or the like may fit in with existing furnishings.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A virtual fitting system, comprising:
   one or more environmental sensors for obtaining environmental data comprising visual information representing a physical environment and target data comprising one or more dimensions of a target;
   a user interface for generating user input data in response to receiving user inputs, wherein the user input data is at least indicative of a selected test object;
   an input/output device for receiving, from a merchant database, a 3-dimensional test object model associated with the selected test object;
   an augmented environment processor that, based on target data obtained from the one or more environmental sensors, generates a 3-dimensional target model of the target, applies the 3-dimensional test object model associated with the selected test object to the 3-dimensional target model to create a virtual fit model, and generates a signal comprising augmented environmental data by integrating the virtual fit model with environmental data obtained by the one or more environmental sensors;
   a haptic device that simulates the feel of the test object based on the virtual fit model; and
   an augmented environmental data display that receives the signal comprising augmented environmental data and displays said augmented environmental data in accordance with said signal.

2. The system of claim 1, wherein the one or more environmental sensors comprise one or more optical sensors configured to scan the target and a circumferential sensor configured to measure a circumference of a portion of the target.

3. The system of claim 1, wherein the augmented environment processor generates the 3-dimensional target model using one or more data points entered into the user interface.

4. The system of claim 1, wherein the one or more environmental sensors comprise one or more physical sensors configured to measure one or more dimensions of the target.

5. The system of claim 1, wherein generating a signal comprising augmented environmental data comprises adding a virtual background behind the virtual fit model.

6. The system of claim 1, wherein the user input data indicative of the selection of the test object comprises one or more of a color, a size, and a brand.

7. A method comprising:
   receiving, from one or more environmental sensors, environmental data comprising visual information representing a physical environment and target data comprising one or more dimensions of a target;
   receiving user input data indicative of a selection of a test object in response to detecting user inputs via a user interface;

receiving, from a merchant database, a 3-dimensional test object model associated with the selected test object;

generating, based on the target data, a 3-dimensional target model of the target;

applying the 3-dimensional test object model associated with the selected test object to the 3-dimensional target model to create a virtual fit model;

generating a signal comprising augmented environmental data by integrating the virtual fit model with the environmental data; and outputting the signal to an augmented environmental data display for displaying said augmented environmental data and to a haptic device for simulating the feel of the test object based on the virtual fit model.

8. The method of claim 7, wherein the one or more environmental sensors comprise one or more optical sensors configured to scan the target and a circumferential sensor configured to measure a circumference of a portion of the target.

9. The method of claim 7, wherein the 3-dimensional target model is generated using one or more data points entered into the user interface.

10. The method of claim 7, wherein the one or more environmental sensors comprise one or more physical sensors configured to measure one or more dimensions of the target.

11. The method of claim 7, wherein generating a signal comprising augmented environmental data comprises adding a virtual background behind the virtual fit model.

12. The method of claim 7, wherein the user input data indicative of the selection of the test object comprises one or more of a color, a size, and a brand.

13. The method of claim 7, wherein the augmented environmental data represents an augmented environment.

14. A non-transitory computer-readable medium storing instructions that, when executed by one or more processors, cause a computer system to:

receive, from one or more environmental sensors, environmental data comprising visual information representing a physical environment and target data comprising one or more dimensions of a target;

receive user input data indicative of a selection of a test object in response to detecting user inputs via a user interface;

receive, from a merchant database, a 3-dimensional test object model associated with the selected test object;

generate, based on the target data, a 3-dimensional target model of the target;

apply the 3-dimensional test object model associated with the selected test object to the 3-dimensional target model to create a virtual fit model;

generate a signal comprising augmented environmental data by integrating the virtual fit model with the environmental data;

output the signal to an augmented environmental data display for displaying said augmented environmental data and to a haptic device for simulating the feel of the test object based on the virtual fit model.

15. The non-transitory computer-readable medium of claim 14, wherein the one or more environmental sensors comprise one or more optical sensors configured to scan the target and a circumferential sensor configured to measure a circumference of a portion of the target.

16. The non-transitory computer-readable medium of claim 14, wherein the 3-dimensional target model is generated using one or more data points entered into the user interface.

17. The non-transitory computer-readable medium of claim 14, wherein the one or more environmental sensors comprise one or more physical sensors configured to measure one or more dimensions of the target.

18. The non-transitory computer-readable medium of claim 14, wherein generating a signal comprising augmented environmental data comprises adding a virtual background behind the virtual fit model.

19. The non-transitory computer-readable medium of claim 14, wherein the user input data indicative of the selection of the test object comprises one or more of a color, a size, and a brand.

20. The non-transitory computer-readable medium of claim 14, wherein the augmented environmental data represents an augmented environment.

* * * * *